US008840833B1

(12) United States Patent
Janousek et al.

(10) Patent No.: US 8,840,833 B1
(45) Date of Patent: Sep. 23, 2014

(54) IRON COATED CHROMIUM POWDER AND SOFC IC MADE THEREFROM

(75) Inventors: Martin Janousek, Sunnyvale, CA (US); Shivanand I. Majagi, Rogers, AK (US)

(73) Assignee: Bloom Energy Corporation, Sunnyvale, CA (US)

( * ) Notice: Subject to any disclaimer, the term of this patent is extended or adjusted under 35 U.S.C. 154(b) by 184 days.

(21) Appl. No.: 13/301,151

(22) Filed: Nov. 21, 2011

Related U.S. Application Data

(60) Provisional application No. 61/418,088, filed on Nov. 30, 2010, provisional application No. 61/504,478, filed on Jul. 5, 2011.

(51) Int. Cl.
*B22F 3/12* (2006.01)
*B22F 9/18* (2006.01)

(52) U.S. Cl.
USPC .................. 419/30; 419/38; 419/57; 419/58; 75/338; 75/10.18

(58) Field of Classification Search
USPC .............................. 419/32, 58; 75/338, 10.18
See application file for complete search history.

(56) References Cited

U.S. PATENT DOCUMENTS

| | | | |
|---|---|---|---|
| 3,821,505 A * | 6/1974 | Wood ............................ 218/130 |
| 7,390,456 B2 | 6/2008 | Glatz et al. |
| 8,110,319 B2 | 2/2012 | Nguyen et al. |
| 8,173,063 B2 | 5/2012 | Zobl et al. |
| 2006/0192323 A1 | 8/2006 | Zobl et al. |
| 2008/0199738 A1* | 8/2008 | Perry et al. ........................ 429/12 |
| 2010/0233576 A1* | 9/2010 | Brandner et al. ............. 429/491 |
| 2011/0135531 A1 | 6/2011 | Hsu et al. |
| 2011/0143261 A1 | 6/2011 | Brandner et al. |

OTHER PUBLICATIONS

Chu et al., "The Kinetics of the Reduction of Chromium Oxide by Hydrogen," Metallurgical Transactions B, vol. 10B, Sep. 1979, © American Society for Metals and the Metallurgical Society of AIME, pp. 401-407.
"Chromium" Wikipedia, the free encyclopedia webpage, 7pgs., Nov. 18, 2010, http://en.wikipedia.org/wiki/Chromium.
Hosokawa Micron Corp., Mechanofusion System® AMS-Mini, Product description, Table-Top Type Particle Composition Processor, Aug. 2003, 2pgs.

* cited by examiner

*Primary Examiner* — George Wyszomierski
*Assistant Examiner* — Ngoclan T Mai
(74) *Attorney, Agent, or Firm* — The Marbury Law Group, PLLC

(57) ABSTRACT

A component, such as a SOFC interconnect, and methods of making the component are provided using various chromium powders, including powder particles with a chromium core covered with an iron shell, a pre-alloyed Cr—Fe powder or a chromium powder produced by hydrogen reduction with hydrogen.

6 Claims, 1 Drawing Sheet

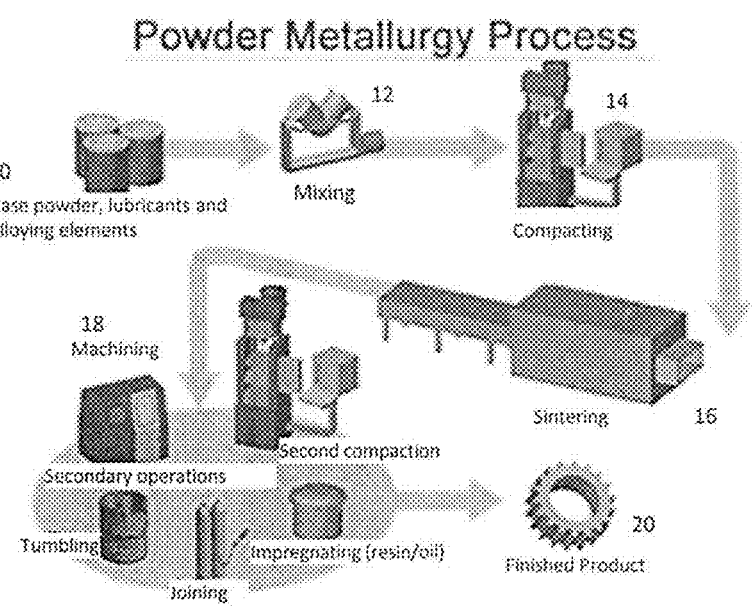

US 8,840,833 B1

IRON COATED CHROMIUM POWDER AND SOFC IC MADE THEREFROM

FIELD

The present invention is directed to metallic powders in general, and in particular manufacturing of solid oxide fuel cell interconnects with uniform properties and structure, such as coefficient of thermal expansion, thermal conductivity, and strength.

BACKGROUND

Fuel cells are electrochemical devices which can convert energy stored in fuels to electrical energy with high efficiencies. High temperature fuel cells include solid oxide and molten carbonate fuel cells. There are classes of fuel cells, such as the solid oxide reversible fuel cells, that also allow reversed operation.

A typical high temperature fuel cell system, such as a solid oxide fuel cell (SOFC) system, includes multiple stacks of SOFCs. Each stack includes multiple SOFCs separated by interconnects (ICs) which provide both electrical connection between adjacent cells in the stack and channels for delivery and removal of fuel and oxidant. An exemplary IC is described in U.S. Published Application U.S. 2008/0199738 A1 published on Aug. 21, 2008 and incorporated herein by reference in its entirety.

Interconnects for SOFCs are commonly made of a high temperature corrosion resistant CrFe alloy, such as an alloy containing 4-6, such as 4-5 weight percent iron (Fe) and 94 to 96 weight percent chromium (Cr). Typically, the interconnects are made via a powder metallurgical route as shown in FIG. 1. This process entails supplying constituent powders 10 (e.g. chromium and iron) and mixing 12 the chromium powder with the desired amount of iron powder. The powder mixture is then placed in a die having a net or near net shape of the interconnect and compacted 14 under high pressure. The compacted powder is then sintered 16 at high temperature to react the chromium and iron particles to form a chromium-iron alloy. Optional secondary operations 18, such as machining, tumbling, second compaction, joining and impregnating may be performed to make the finished product 20.

Interconnects made by the conventional process, however, may suffer from an inhomogeneous distribution of iron in the Cr—Fe alloy. This inhomogeneity in iron distribution leads to inhomogeneous physical and mechanical properties, such as thermal expansion, which in turn affects the coefficient of thermal expansion, and conductivity in the localized areas resulting in poor performance of the SOFC.

SUMMARY

An embodiment relates to a method of making a component. This method includes providing a metal powder comprising particles having a chromium core covered with an iron shell and compacting the metal powder with a die.

Another embodiment relates to a method of making a component. The method includes providing a chromium metal powder produced by reduction with hydrogen and compacting the chromium metal powder in a die to form the component.

Another embodiment relates to a method of making an interconnect. The method includes providing a pre-alloyed Cr—Fe powder and compacting the pre-alloyed Cr—Fe powder in a die to form the interconnect.

Another embodiment, relates to a solid oxide fuel cell interconnect comprising chromium and iron substantially free of aluminum and silicon.

BRIEF DESCRIPTION OF THE DRAWINGS

FIG. 1 is a flow diagram illustrating a conventional powder metallurgy process.

DETAILED DESCRIPTION

In contrast to the conventional method of fabricating a SOFC interconnect, a first embodiment of the invention employs a powder metallurgical process utilizing iron coated chromium particles instead of a mixture of individual chromium and iron powders. Applicant has discovered that coating the hard chromium particles with a shell of soft iron results in a powder with higher compressibility. Preferably, 100% of the chromium particles that are supplied to the press to be pressed or compacted into the IC are coated with iron. However, in alternative embodiments less than 100% of the chromium particles that are compacted may be coated with Fe. For example, the percentage of coated chromium particles may be at least 99%, at least 98%, at least 95% or at least 90%, while the remainder of the Cr particles remain uncoated.

In addition to higher compressibility, the present inventors discovered that with this embodiment it is possible to make a SOFC interconnect that has more homogeneous physical and mechanical properties. This is because the powder mixture has a more homogeneous distribution of iron than the conventional powder mixture. That is, because the powder mixture is composed of chromium particles coated with an iron shell, the iron is more evenly distributed within the powder mixture (the iron is substantially uniform throughout the interconnect since all or most of the Cr particles are coated with a Fe shell).

This embodiment allows higher compaction densities and the use of lower tonnage equipment to achieve the same compaction densities. In addition, the improved iron homogeneity also results in improved uniformity of physical properties which are a function of composition, for example, the coefficient of thermal expansion CTE. Further, a uniform iron distribution improves chemical properties, for example oxidation and nitridation resistance, of the interconnect during processing and operation.

Applicant has also found that this embodiment of the invention may lead to reduced sintering times due to shorter diffusion paths (faster alloying of chromium and iron due to a better mixed powder due to the contact of all or most Cr particles with a respective iron shell). For example, sintering may be performed at a temperature of at least 1400° C. between 1400-1500° C., for 10 hours or less, such as 5-10 hours. With the shorter diffusion paths in this embodiment, it is also possible to use a coarser chromium powder than is used in the conventional process. In this embodiment, it may also be possible to sinter the compacted interconnect using an inert gas or lower a quality hydrogen atmospheres than in the conventional process. This is possible because the iron shell protects the chromium particle from oxidizing.

In an embodiment, the iron coated chromium particles have a mean diameter between 145 and 175 microns, the chromium cores have a mean diameter between 130-150 microns, and the iron shells have a mean diameter between 15 and 25 microns. For example, a chromium powder with an average particle size of 140 microns may have the particles coated with an 18 micron thick iron shell to achieve a 4-6, such as 5 wt % Fe/94-96, such as 95 wt % Cr CrFe alloy. The thickness of the iron shell may be selected to determine the desired overall iron content in the final part. Preferably, the CrFe composition has 1-10 wt %, such as 4-6 wt % iron. Iron coating methods that may be used, include but are not limited to, iron electro or electroless coating of Cr powder, and iron fluidized bed coating (physical and/or chemical) of the Cr powder. The initial Cr powder may be made by any suitable process, such as aluminothermic reaction, electrolysis or hydrogen reduction (as will be described below) of chromia.

In an alternative embodiment, the iron coated chromium powder may be mixed with a second powder to provide additional alloying elements. For example, the second powder may include at least one of Co, Ni, Cu, Fe, Y, or Cr. For example, the second powder may include uncoated Cr particles or the second powder may include iron particles to increase the compressibility of the mixed powders.

In a second embodiment of the invention, the Cr—Fe interconnects may be produced using pre-alloyed Cr—Fe powders, which will also provide a uniform distribution of Fe in the sintered part. The pre-alloyed powder is provided into a die and pressed (i.e., compacted) into the interconnect shape. The homogeneity in metallurgical composition will reduce the localized variation in physical properties, e.g., coefficient of thermal expansion, thermal conductivity, etc. The pre-alloyed powder may be produced by an aluminothermic reaction or process.

In one process, the pre-alloyed Cr—Fe powder is made by adding iron to a chromium melt recovered from the aluminothermic process, followed by atomizing the melt, or by solidifying the melt and then mechanically grinding and/or milling the solidified melt. In this process, the starting material may be chromium (III) oxide (chromia). The chromia is mixed with powdered aluminum and melted by being ignited or heated to a sufficiently high temperature. During the process, the chromia is reduced to elemental chromium metal while aluminum is oxidized to alumina (i.e., aluminum oxide). The molten chromium is collected from the reaction vessel (e.g., crucible) and alumina is then removed from the reaction vessel as slag. Alternatively, the starting material may be a chromium iron oxide, or a mixture of a chromium oxide and an iron oxide.

The chromium melt is optionally purified and then mixed with an iron powder or iron melt to form a chromium-iron melt. The melt is then solidified and mechanically ground and/or milled, or alternatively is atomized and solidified, to form a chromium-iron alloy powder. The iron may be added in the desired quantity to the melt such that the powder made from the melt contains 1-10 wt % iron, such as 4-6 wt % iron. Alternatively, more or less iron is added to the melt to form an alloy powder having more or less than 1-10 wt % iron if additional chromium and/or iron powder will be added to the resulting alloy powder before the powder pressing step.

In another alternative method, no iron is added to the chromium melt obtained from the aluminothermic process. In this method, the pre-alloyed Cr—Fe powder is made by first forming a solid chromium powder material by the aluminothermic process. Then, the solid chromium powder is remelted to form a new chromium-iron melt. This new melt is formed from iron (e.g., iron melt or iron powder) and the chromium powder by heating the iron and the chromium powder. The chromium-iron melt may be atomized to form the pre-alloyed Cr—Fe powder. Alternatively, the new melt may be solidified and then mechanically ground and/or milled to form the pre-alloyed Cr—Fe powder.

In another alternative method, the pre-alloyed Cr—Fe powder is made by atomizing a Cr—Fe melt recovered from the aluminothermic process, or by solidifying the recovered melt and then mechanically grinding and/or milling the solidified melt. If desired, the starting material in this aluminothermic process may comprise both chromia and iron oxide which are then converted to chromium and iron. For example, a chromite ore powder comprising iron oxide and chromia (e.g., a $FeO.Cr_2O_3$ ore which contains additional elements, such as magnesium, or which is purified with minimum magnesium content) is mixed with aluminum. The mixed powders are melted, such that the ore powder is reduced to form a chromium-iron melt, while the aluminum is oxidized to form alumina. The alumina is removed as slag. The melt is then optionally purified and then atomized and solidified to form the chromium-iron alloy powder. If needed, iron may be added to the melt in the desired quantity such that the powder contains 4-6 weight percent iron. Alternatively, additional chromium and/or iron powder may be added to the resulting alloy powder before the powder pressing step.

In another alternative method, the iron coated chromium powder of the first embodiment or the pre-alloyed Cr—Fe powder may be made using a mechanical method, such as a multiple powder mechanical compression and shearing effect method. In an example embodiment, the Mechanofiision System® made by Hosokawa Micron Corporation, may be used to coat a chromium powder with an iron shell by compressing and shearing a dispersion of chromium and iron powder particles.

Chromia (also called green chrome) is available in high volumes for the pigment industry, and the aluminothermic reaction is a low-cost process. As noted above, the iron coated chromium powder of the first embodiment or the pre-alloyed Cr—Fe powder of the second embodiment can be mixed with Cr powder and/or Fe powder to make the final composition with the desired Cr—Fe composition (e.g., 1-10, such as 4-6 weight percent iron, and remainder chromium, with optional Y, Cu, Ni or Co addition of 1 weight percent or less). The interconnect may also contain one or more of aluminum, silicon, oxygen or nitrogen which may be present as unavoidable impurities.

In a third embodiment of the invention, chromium powder is formed by reducing chromia in a hydrogen containing atmosphere. In contrast to chromium made using an aluminothermic process, chromium made by reducing chromia using a hydrogen containing atmosphere is relatively inexpensive and eliminates or reduces contaminations such as alumina, silica, nitrogen and oxygen.

Chromium powder made by hydrogen reduction may have a content of S, P, N, O, Si, and Al of $S \leq 100$ ppm, $P \leq 100$ ppm, $N \leq 400$ ppm, $O \leq 400$ ppm, $Si \leq 400$ ppm, and $Al \leq 500$ ppm and essentially no alumina, aluminum, silicon and/or silica (e.g., a substantially Al and Si free IC contains 0 to 10 ppm of alumina, aluminum, silicon and/or silica). For example, the Cr powder contains $10 \leq S \leq 100$ ppm, $10 \leq P \leq 100$ ppm, $10 \leq N \leq 400$ ppm, $10 \leq O \leq 400$ ppm, $0 \leq Si \leq 400$ ppm, and $0 \leq Al \leq 500$ ppm. Because of this, chromium powder made by hydrogen reduction has superior properties, for example higher compressibility, higher mechanical strength, lower gas permeability and lower tool/die wear.

In an embodiment, the reduction of chromia can be performed using a continuous hydrogen furnace (chromium oxide powder placed in trays) or using a high temperature hydrogen cyclone to avoid excessive sintering of individual/agglomerated chromium powder particles. The chromium powder may be made by reacting a non-metallic chromium compound (e.g. chromia) powder in an atmosphere of hydrogen having a dew point between −30 and −50° C., such as −40 to −45° C., at a temperature $\geq 1000°$ C., such as 1200-1400° C. Chromium made by this process can be supplied to a die having a net or near net shape of the desired component and compacted. The compacted component may then be sintered to reduced porosity and form a strong solid component.

A second powder may be added to the chromium powder. For example, the hydrogen reduced chromium powder discussed above can be mixed with the iron coated chromium powder of the first embodiment, the pre-alloyed Cr—Fe powder of the second embodiment, a Cr powder and/or Fe powder to make the final composition. Alternatively, a second metal powder may include one or more of Co, Ni, Cu, or Y. Upon sintering, the second powder reacts with the chromium powder, forming an alloy. In one embodiment, the second powder includes sufficient Fe so that the final component has 4-6 wt % iron (e.g., 5 wt % Fe and 95 wt % Cr). Iron powder is softer than chromium and aids in compacting. Alternatively, the Cr powder made by hydrogen reduction may be coated with the Fe shell as described in the first embodiment prior to compacting and sintering. In an alternative embodiment, the second powder includes an organic material. The organic material may act as a lubricant, binder or flux.

After mixing and compacting the powders of the first, second or third embodiments, the compacted powder may be sintered in an atmosphere including hydrogen. Sintering may be performed, for example, at a temperature between 1300-1500° C., such as 1400-1500° C., for 5-30 hours, such as 5-10 hours for Fe coated Cr powder and for 15-25 hours for mixed Cr and Fe powders.

In general, the powder of the embodiments described above (e.g., Fe coated Cr powder, H reduction formed Cr powder, and pre-alloyed Cr—Fe powder) are formed into a final product 20, such as the SOFC IC, using the method shown in FIG. 1 and described above. While the SOFC IC was described as the final product 20, any chromium or chromium alloy product may be made from the powder of the above embodiments.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of manufacturing an interconnect, comprising:
    providing a pre-alloyed Cr—Fe powder made from a melt containing iron and chromium recovered from an aluminothermic process;
    compacting the pre-alloyed Cr—Fe powder in a die to form the interconnect; and
    sintering the compacted powder at a temperature between 1300-1500° C. for 5-30 hours.

2. The method of claim 1, further comprising mixing the pre-alloyed Cr—Fe powder with a second powder comprising at least one of Co, Ni, Cu, Fe, Y, or Cr.

3. The method of claim 1, wherein the interconnect comprises 1-10 wt % iron and balance chromium and the interconnect is configured for a solid oxide fuel cell stack.

4. The method of claim 1, wherein the step of sintering the compacted powder comprises sintering the compacted powder in an atmosphere comprising hydrogen or an inert gas after compacting.

5. The method of claim 1, wherein the interconnect has a substantially homogeneous distribution of iron and a substantially homogeneous distribution of coefficient of thermal expansion throughout the interconnect.

6. The method of claim 1, wherein the pre-alloyed Cr—Fe powder is made by adding iron to a chromium melt recovered from the aluminothermic process to form the melt containing iron and chromium recovered from the aluminothermic process, and atomizing the melt.

* * * * *